United States Patent [19]
Murasugi et al.

[11] Patent Number: 5,906,559
[45] Date of Patent: May 25, 1999

[54] AUTOMATIC TRANSMISSION WITH ANTI-CREEP CONTROL APPARATUS

[75] Inventors: Takashi Murasugi, Shizuoka; Motoharu Nishio, Yokohama; Hiromasa Sakai, Kanagawa, all of Japan

[73] Assignee: Nissan Motor Co., Ltd., Yokohama, Japan

[21] Appl. No.: 08/887,841

[22] Filed: Jul. 3, 1997

[30] Foreign Application Priority Data

Jul. 3, 1996 [JP] Japan .................................. 8-173446

[51] Int. Cl.$^6$ .............................. F16H 61/20; F16H 47/06
[52] U.S. Cl. .............................................. 477/93; 477/114
[58] Field of Search ............................... 477/93, 113, 114, 477/115, 120

[56] References Cited

U.S. PATENT DOCUMENTS

| | | | |
|---|---|---|---|
| 4,644,826 | 2/1987 | Kubo et al. | 477/114 X |
| 4,840,092 | 6/1989 | Sakaguchi et al. | 477/114 X |
| 5,586,954 | 12/1996 | Iwata et al. | 477/114 X |
| 5,741,200 | 4/1998 | Taniguchi et al. | 477/93 |
| 5,765,117 | 6/1998 | Horiguchi | 477/120 X |

FOREIGN PATENT DOCUMENTS

| | | |
|---|---|---|
| 681 123 | 11/1995 | European Pat. Off. . |
| 63-106449 | 5/1988 | Japan . |

*Primary Examiner*—Khoi Q. Ta
*Attorney, Agent, or Firm*—Foley & Lardner

[57] ABSTRACT

An automatic transmission with an anti-creep control apparatus includes a torque converter connected to the engine, first and second friction elements, and a control unit. The first friction element is operated when the automatic transmission is put in a drive range. The second friction element performs to prevent a reverse rotation of an output shaft of the automatic transmission. The control unit executes an anti-creep control controls, controlling the second friction element to prevent a reverse rotation of an output shaft of the automatic transmission when the anti-creep control is executed, holds the engagement of the second friction element during a time period from the time when the anti-creep control is cancelled to the time when the first friction element is fully engaged, and disengages the second friction element thereafter.

9 Claims, 10 Drawing Sheets

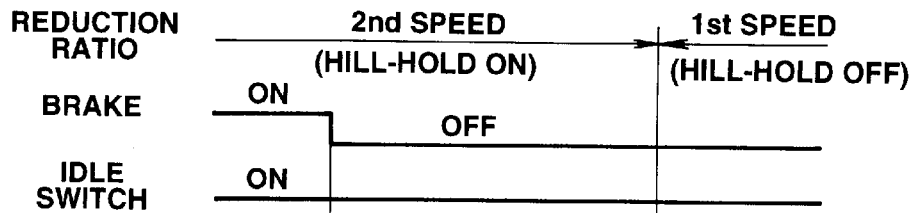
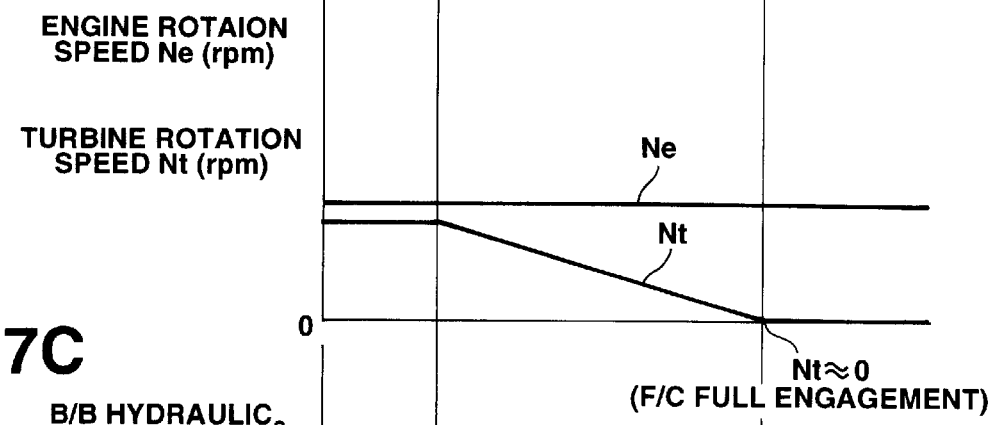
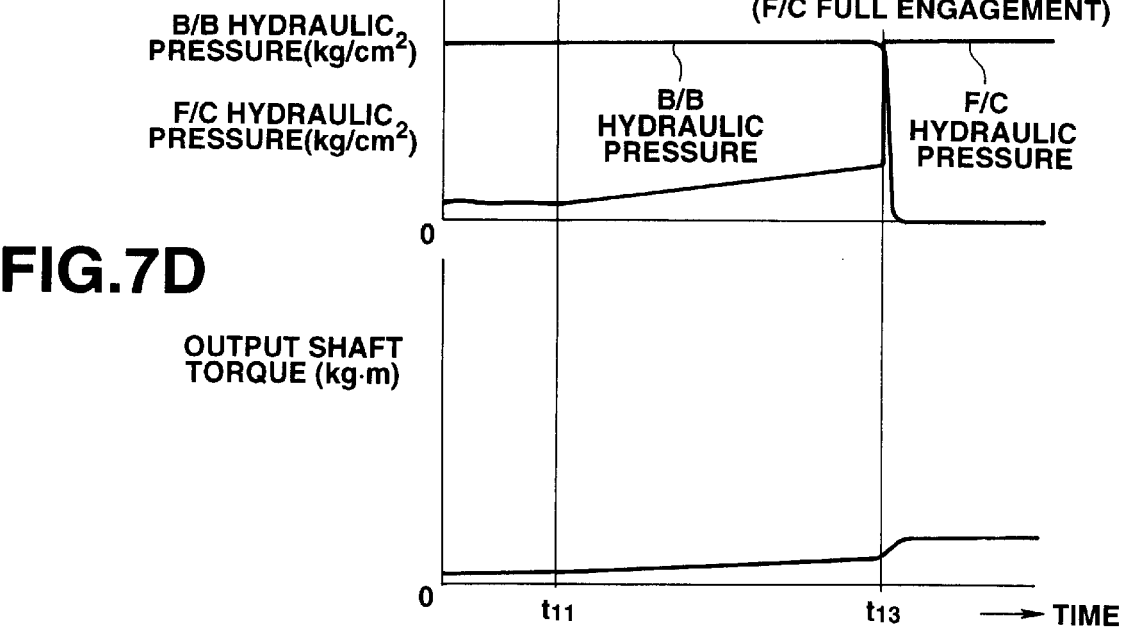

5,906,559

AUTOMATIC TRANSMISSION WITH ANTI-CREEP CONTROL APPARATUS

BACKGROUND OF THE INVENTION

The present invention relates to improvements in an automatic transmission with an anti-creep control apparatus for a vehicle.

Japanese Patent Provisional Publication No. 63-106449 discloses an apparatus that executes an anti-creep control for preventing a transmitting of engine power to driven wheels during an idling condition and a hill-hold control for preventing the backward movement of a staying vehicle on an uphill road. The shift change control can be executed by selectively operating friction elements, as shown by a time chart in FIG. 10: (a) starting the anti-creep control at the moment T1, (b) starting the hill-hold control at the moment T3 so as to engage a brake for shifting (second coast brake), (c) starting a starting operation of the vehicle at the moment T3, and (d) canceling the anti-creep control by the execution of the starting operation. The apparatus executes a control for starting the engagement of the forward clutch and for promptly disengaging a shifting brake of the automatic transmission at the moment T5 when the hydraulic pressure of a forward clutch (C1) reaches a predetermined value $P_{sset}$. During this period, by applying a signal pressure Ps to a servo hydraulic pressure control of the forward clutch and a servo hydraulic pressure control of a brake for shifting, the hydraulic pressure of the both servos are relationally controlled.

However, an actual clutch hydraulic pressure and an actual brake hydraulic pressure are not applied to the servo control of the forward clutch and the shifting brake although the signal hydraulic pressure Ps is used to relationally control the forward clutch and the shifting brake. Therefore, if the responsibility of the actual clutch hydraulic pressure and the actual brake hydraulic pressure are deviated, various problems are generated by this apparatus. For example, in order to start the engagement of the forward clutch (C1) and to simultaneously cancel the anti-creep control at the moment T5 after the acceleration ON at the moment T4 shown in FIG. 10, it is necessary to raise the forward clutch hydraulic pressure to a value that is greater than the hydraulic pressure value Px since the input torque of the automatic transmission is increased. In order to prevent the engagement shock, the hydraulic pressure is once increased to the shelf pressure and then to the maximum pressure. Herein, if the forward clutch hydraulic pressure is radically (such as steppingly) increased to the shelf pressure Px to execute the engagement of the forward clutch, the shifting brake (B1) is fully engaged at the moment T5 and the reduction speed ratio is set at the first speed since the hydraulic pressure of the shifting brake is promptly decreased. As a result, the shock due to the engagement of the forward clutch (C1) is amplified by the first speed and performs as an output shaft torque. Therefore, a drive feels large engagement shock.

Further, when it is intended to radically increase the forward clutch hydraulic pressure, the hydraulic pressure responsibility is largely degraded if entrained air exists in the hydraulic passage of the control hydraulic system for the forward clutch and the shifting brake or if it is cold. When the responsibility of the forward clutch hydraulic pressure is degraded by the entrained air in the hydraulic passage and that no air is mixed in the hydraulic passage of the control hydraulic system of the shifting brake (B1), the hydraulic pressure of the shifting brake (B1) is promptly decreased and the shifting brake (B1) is fully disengaged. Therefore, the hill-hold function becomes inoperative. If the vehicle is put in this situation, during a time period from the moment T4 to the moment T5, the forward clutch hydraulic pressure is not sufficiently increased and the output torque is still small. Therefore, the automatic transmission is temporarily set in the neutral position. This invites a problem that the vehicle is moved backward on an uphill road.

SUMMARY OF THE INVENTION

It is an object of the present invention to provide an improved automatic transmission with an anti-creep control apparatus that is free of the above-mentioned problems.

An automatic transmission with an anti-creep control apparatus according to the present invention is installed to an engine of a vehicle. The automatic transmission comprises a torque converter, a first friction element, a second friction element, an engine output detector, a braking detector, a torque-converter output-shaft rotation speed detector, and a control unit. The first friction element operates when the automatic transmission is put in a drive range. The second friction element prevents a reverse rotation of an output shaft of the automatic transmission when an anti-creep control is executed. The engine output detector detects an output of the engine. The braking detector detects that a brake of the vehicle is operated. The torque-converter output-shaft rotation speed detector detects an output shaft rotation speed of the torque converter. The control unit is arranged to perform executing the anti-creep control by slipping the first friction element when the automatic transmission is set in a the drive range and when the vehicle is stopping, deciding as to whether the anti-creep control is cancelled, holding the engaged condition of the second friction element during a time period from the time when the anti-creep control is cancelled to the time when the first friction element is fully engaged, and disengaging the second friction element after the first friction element is fully engaged.

BRIEF DESCRIPTION OF THE DRAWINGS

FIGS. 7A to 7D are time charts for explaining the manner of operation of the forward clutch engagement control in an acceleration OFF state;

DETAILED DESCRIPTION OF THE INVENTION

Figure 1:
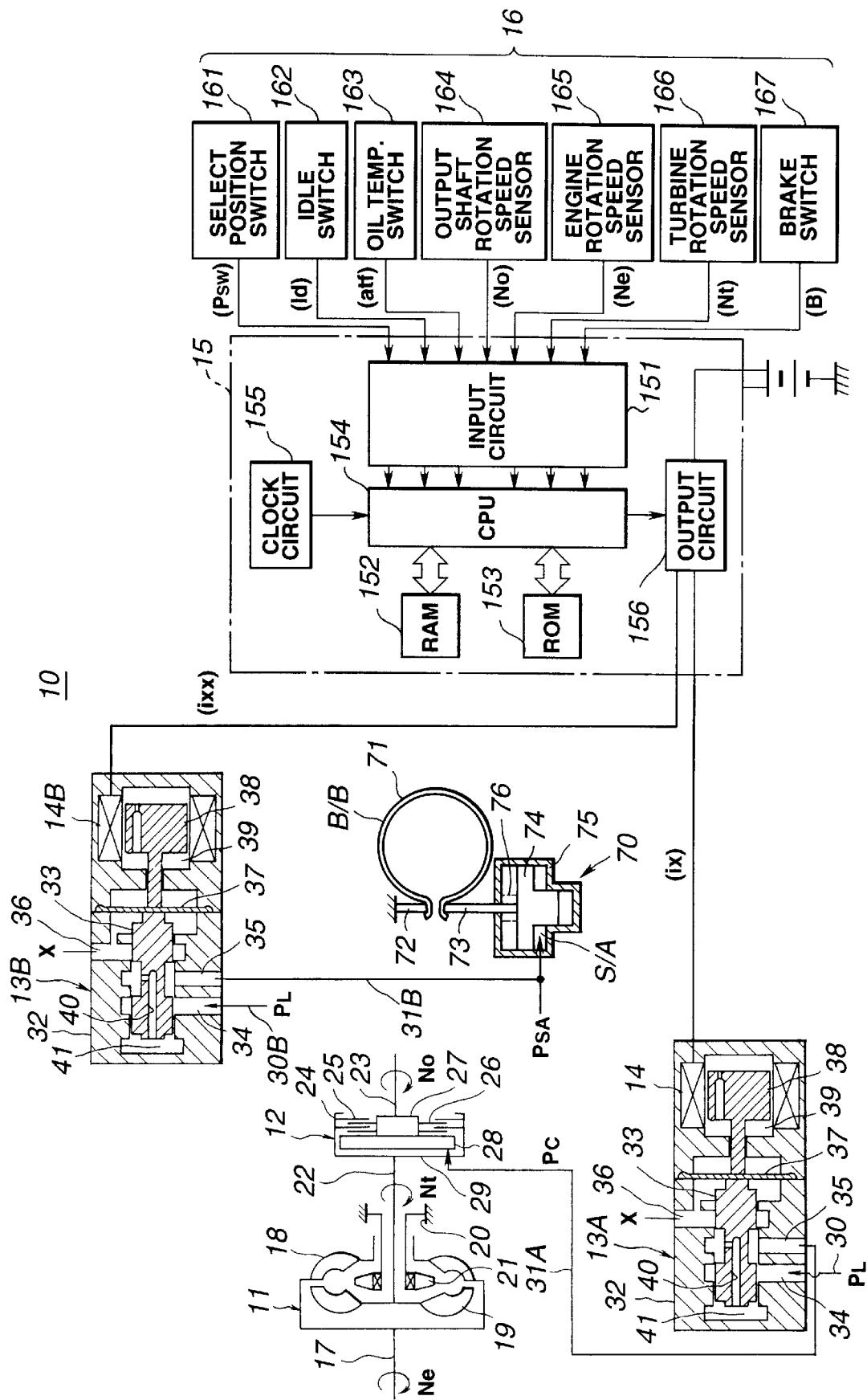
FIG. 1 is a schematic structural view shows an embodiment of an automatic transmission with an anti-creep control apparatus according to the present invention.

Referring to FIGS. 1 to 9, there is shown an embodiment of an automatic transmission with an anti-creep control apparatus 10 for a vehicle in accordance with the present invention.

The anti-creep control apparatus 10 of the automatic transmission executes an anti-creep control in a manner to absorb the torque transmission by setting a forward clutch (start clutch) of a first friction element into a semi-engagement condition (absorbing the transmission torque through the slippage of the forward clutch F/W).

The automatic transmission with the anti-creep control apparatus 10 comprises a torque converter 11, a forward clutch 12, a band servo 70, first and second oil pressure modulators (OPM) 13A and 13B, solenoids (actuator) 14A and 14B, a control unit 15, and an input sensor unit 16.

The torque converter 11 is a kind of a hydraulic power transmission apparatus that transmits a rotational drive force of an engine (not shown) by amplifying function thereof until the rotation speed of the engine reaches a predetermined rotation speed. The torque converter 11 is constituted by a pump impeller 18, which is connected with a drive input shaft 17 receiving the rotational drive force of the engine, a turbine runner 19 to which the drive force from the pump impeller 18 is transmitted through fluid, and a stator 21, which is fixed to a transmission case 20 through a not-shown one-way clutch. The turbine runner 19 is interconnected with a drive force output shaft 22.

The forward clutch 12 is one of engaging elements for a gear train including a planetary gear units of the automatic transmission. The forward clutch 12 is a wet type multi-plate clutch, which is held in the engaged condition when the automatic transmission is set in a drive shift position. The forward clutch 12 is constituted by a clutch drum 24 interconnected with a drive output shaft (transmission input shaft) 22, clutch plates 25 disposed in and splined to the clutch drum 24, clutch plates 26 alternatively arranged with the clutch plates 25, a clutch hub 27 in which the clutch plates 27 are splinedly disposed, a clutch piston 28 installed to the clutch hub 27, and a piston chamber 29 to which controlled hydraulic pressure (forward clutch hydraulic pressure) Pc for operating the clutch piston 28 is supplied. The clutch hub 27 is connected with a transmission output shaft 23 through the gear train of the automatic transmission.

The first and second oil pressure modulators (OPM) 13A and 13B are disposed in first and second line-pressure passages 30A and 30B for supplying a line pressure $P_L$ formed by controlling the discharged pressure of an oil pump (not shown) by means of a pressure regulator valve (not shown). The first OPM 13A is connected with the piston chamber 29 of the forward clutch 12 through the first hydraulic passage 31A. The second OPM 13B is connected with a S/A chamber of a band servo 70 through the second hydraulic passage 31B. The first and second OPM 13A and 13B are of a proportional electromagnetic solenoid valve type in which a spring force of a pressure reducing valve is replaced by the electromagnetic force of a solenoid and increases the output port pressure according to an OPM electric current ix applied to each of the solenoid 14A and 14B so as to perform the characteristics shown in FIG. 5. Each of the first and second OPM 13A and 13B comprises a valve body 32 in which a spool 33, a control pressure input port 34, a control pressure output port 35, a drain port 36, a diaphragm 37, a spool operation piston 38, an air chamber 39, a communication passage 40, a pressure oil chamber 41 and the solenoid 14A, 14B are disposed. Each of the first and second OPM 13A and 13B is arranged such that the spool 33 is moved at a position where the electromagnetic force of the solenoid 14A, 14B (a force pushing the spool 33 to the left hand side in FIG. 1) is balanced with the hydraulic pressure force (a force pushing the spool 33 to the right hand side in FIG. 1).

The band servo 70 includes a spool 74 engagingly installed in a valve body 75, a piston rod 73 connected to an upper end portion of the spool 74, a spring 76 disposed around the piston rod 73 in the valve body 75. When the control hydraulic pressure PSA is supplied to the S/A chamber of the band servo 70 through the second hydraulic passage 31B, the spool 74 is moved upwardly in FIG. 1 against the spring force of the spring 76. Therefore, an end portion of a band brake (B/B) 71 is pushed by the piston rod. Since the other end portion is supported by a rod pin 72, the band brake 71 is engaged.

The control unit 15 includes a microcomputer that includes an input circuit 151, RAM (random access memory) 152, ROM (read only memory) 153, CPU 154, a clock circuit 155, and an output circuit 156. The input circuit 151 changes input signals from sensors of the sensor unit 16 and converts them into digital signals so as to be processed in the CPU 154. The converted digital signals are sent from the input circuit 151 to the CPU 154. The RAM 152 is a random access memory from and in which information such as the input signals of the sensors and the calculated data is red and written by the CPU 154. The ROM 153 previously stores information necessary for the processing in the CPU 154 and is accessed with the CPU 154 according to the demand from the CPU 154. The CPU 154 executes a calculation process according to the predetermined processing condition of the various input information. The CPU 154 executes the processing of the input information in the anti-creep control, the forward clutch control and the hill-hold control. The clock circuit 155 sets the operation time of the CPU 154. The output circuit 156 outputs control current signals ix and ixx to the first and second solenoid 14A and 14B, respectively, according to the calculated signal from the CPU 154.

The input sensor unit 16 includes a select position sensor 161, an idle switch 162, an oil temperature sensor 163, an output shaft rotation-speed sensor (an output shaft rotation-speed detecting means that may be replaced by a vehicle speed sensor) 164, an engine rotation speed sensor (engine rotation-speed detecting means) 165, a turbine rotation-speed sensor 166, and a brake switch 167.

The select position sensor 161 outputs a switch signal indicative of a selected range of the automatic transmission (a select position). More particularly, when the selected range of the automatic transmission is a neutral range (N-range), the select position switch 161 is turned ON. Only when the selected range is a drive range such as D-range, the select position switch 161 is turned OFF and outputs the switch signals PSW to the input circuit 151. The switch signal PSW output from the select position switch 161 indicates that the select range of the automatic transmission is changed from N-range to D-range (N→D). The switch signal PSW is used as a signal for deciding a start time of the supply of the line pressure. The idle switch 162 detects as to whether a throttle valve of the engine is fully closed or not, that is, as to whether the engine is put in an idle condition or not. When the throttle valve is open, the idle switch 162 is turned OFF. Only when the throttle valve is put in a full close condition, the idle switch 162 is turned ON and outputs a switch signal Id. Since the idle switch 162 is turned OFF when the throttle opening degree of the engine is greater than a predetermined value, it functions as an engine output detecting means. It will be understood that the idle switch 162 may be replaced by an engine throttle sensor. The oil temperature sensor 163 detects temperature of the automatic transmission fluid (ATF) and outputs an oil temperature signal Taft. The output shaft rotation speed sensor 164 detects an output shaft rotation speed No of the automatic-transmission output shaft 23. The signal No output from the output-shaft rotation speed sensor 164 is used as a signal indicative of a vehicle speed. The engine rotation-speed sensor 165 detects a rotation speed (engine rotation speed) Ne of the drive-force output shaft 17 and outputs an engine rotation speed signal Ne. The turbine rotation-speed sensor 166 detects a rotation speed (turbine rotation speed) Nt of the drive output shaft 22 and outputs a turbine rotation-speed signal Nt. The control unit 15 calculates a rotation-speed difference between the engine rotation-speed Ne and the turbine rotation-speed Nt on the basis of the engine rotation-speed signal Ne and the turbine rotation-speed signal Nt. The anti-creep control is executed by feedback-controlling the rotation-speed difference. The brake switch 167 is disposed in the vicinity of a brake pedal and detects an operation of a foot brake and/or side brake. When the brake is operated, the brake switch 167 outputs a brake operation signal B.

Figure 2:
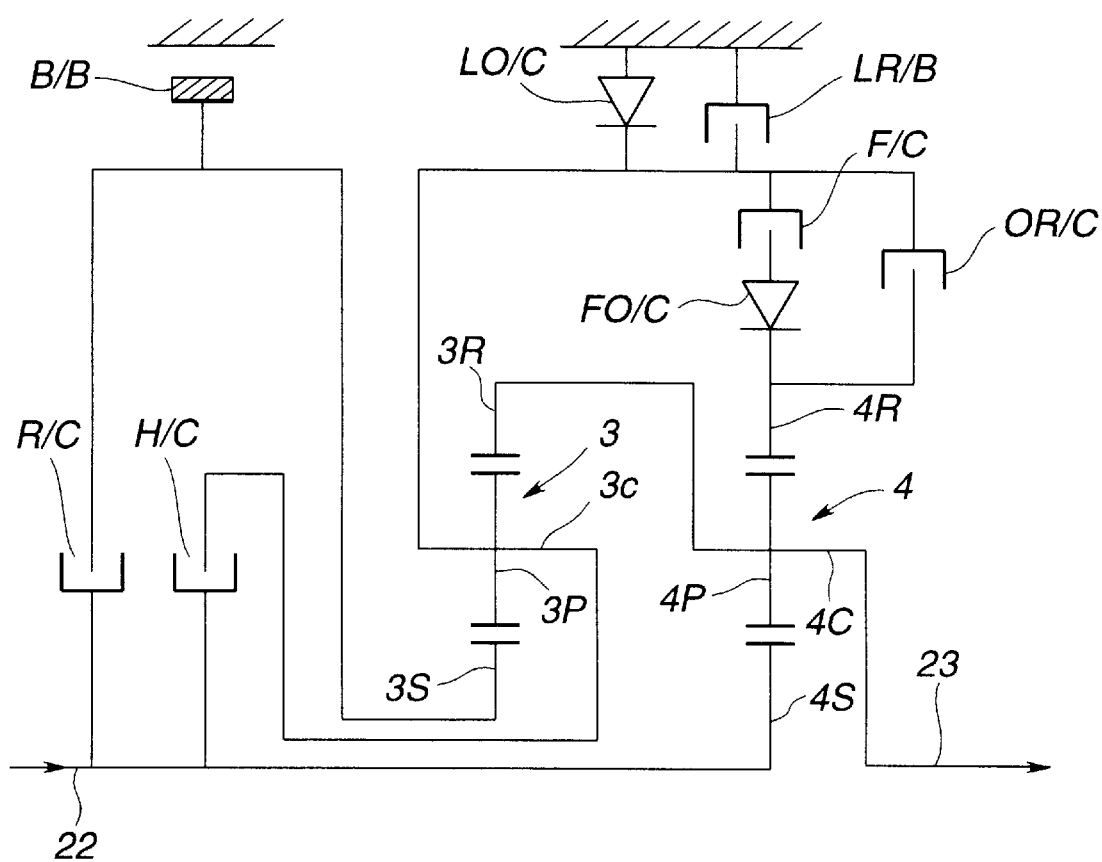
FIG. 2 is a skeleton view showing a gear train of the automatic transmission of FIG. 1.

FIG. 2 shows a gear train of the automatic transmission of the first embodiment according to the present invention. The gear train is constituted such that the transmission input shaft 22 and a transmission output shaft 23 are coaxially aligned through a front planetary gear set 3 and a rear planetary gear set 4. A sun gear 3S of the front planetary gear set 3 is fixable by a band brake B/B and is engageable with the transmission input shaft 22 through a reverse clutch R/C. A carrier 3C supporting a pinion 3P of the front planetary gear set 3 is engageable with the transmission input shaft 22 through a high clutch H/C and is supported by a low one-way clutch LO/C so as not to be rotated in the reverse direction. The carrier 3C is fixable by means of a low reverse brake LR/B and is engageable with an internal gear 4R of the rear planetary gear set 4 by means of a forward clutch F/C and a forward one-way clutch FO/C. The forward one-way clutch FO/C is arranged so as to transmit the rotation having the same rotation of the transmission input shaft 22 from the front carrier 3C to the rear internal gear 4R. When the rear internal gear 4R is rotated in high speed through the rotation of the front carrier 3C, the forward one-way clutch FO/C is released so as to allow the relative rotation between the front carrier 3C and the rear internal gear 4R.

Since the forward one-way clutch FO/C is arranged to cancel the engine brake when receiving a reverse driving torque from the transmission output shaft 23, an over-run clutch OR/C, which functions to engage the input and output elements by canceling the function of the forward one-way clutch FO/C in an engine-brake required condition. A rear carrier 4C of the rear planetary gear set 4 engaged with the internal gear 3R of the front planetary gear set 3 and the output shaft 23. A sun gear 4S of the rear planetary gear set 4 is engaged with the transmission input shaft 22.

By selectively operating the friction elements shown in Table 1, the automatic transmission selects a first speed, a second speed, a third speed, a fourth speed or reverse. In Table 1, a mark ○ represents that the marked friction element is operated. No mark represents that friction element is not operated, and a mark Δ represents that the friction element should be operated in the select shift position when it is desired to operate the engine brake.

Further, in the above-mentioned structure, the first friction element corresponds to the forward clutch (F/C) 12, the one-way clutch corresponds to the low one-way clutch (LO/C), the second friction element corresponds to the band brake (B/B) 71. That is, by the operation of the band brake (B/B) 71, the reverse rotation of the transmission output shaft 23 is prevented by the low one-way clutch LO/C, and the vehicle is put in a hill-hold condition in that the vehicle is stopped on an uphill road. When the forward clutch (F/C) 12 is put in an inoperative condition, the transmission input shaft 22 is set in a race-abled condition.

A shift change of the above shift gear train is controlled by the shift-change hydraulic circuit schematically shown in FIG. 1. The shift-change hydraulic circuit is controlled by the control unit 15 of FIG. 1. The shift-change hydraulic circuit hydraulically operates the forward clutch F/C, the band brake B/B, the reverse clutch R/C, the over-run clutch OR/C and the low-reverse brake LR/B through the electro-magnetic valve. The ON and OFF switching and the electric current control of the electromagnetic valve is executed by the CPU 154 of the control unit 15.

TABLE 1

|      | F/C | H/C | R/C | OR/C | B/B | LR/B | FO/C | LO/C |
|------|-----|-----|-----|------|-----|------|------|------|
| 1ST  | o   |     |     | Δ    |     | Δ    | o    | o    |
| 2ND  | o   |     |     | Δ    | o   |      | o    |      |
| 3RD  | o   | o   |     | Δ    |     |      | o    |      |
| 4TH  | o   | o   |     |      | o   |      |      |      |
| REV. |     |     | o   |      |     | o    |      |      |

Next, the anti-creep control of the automatic transmission in accordance with the present invention will be discussed hereinafter.

Figure 3:
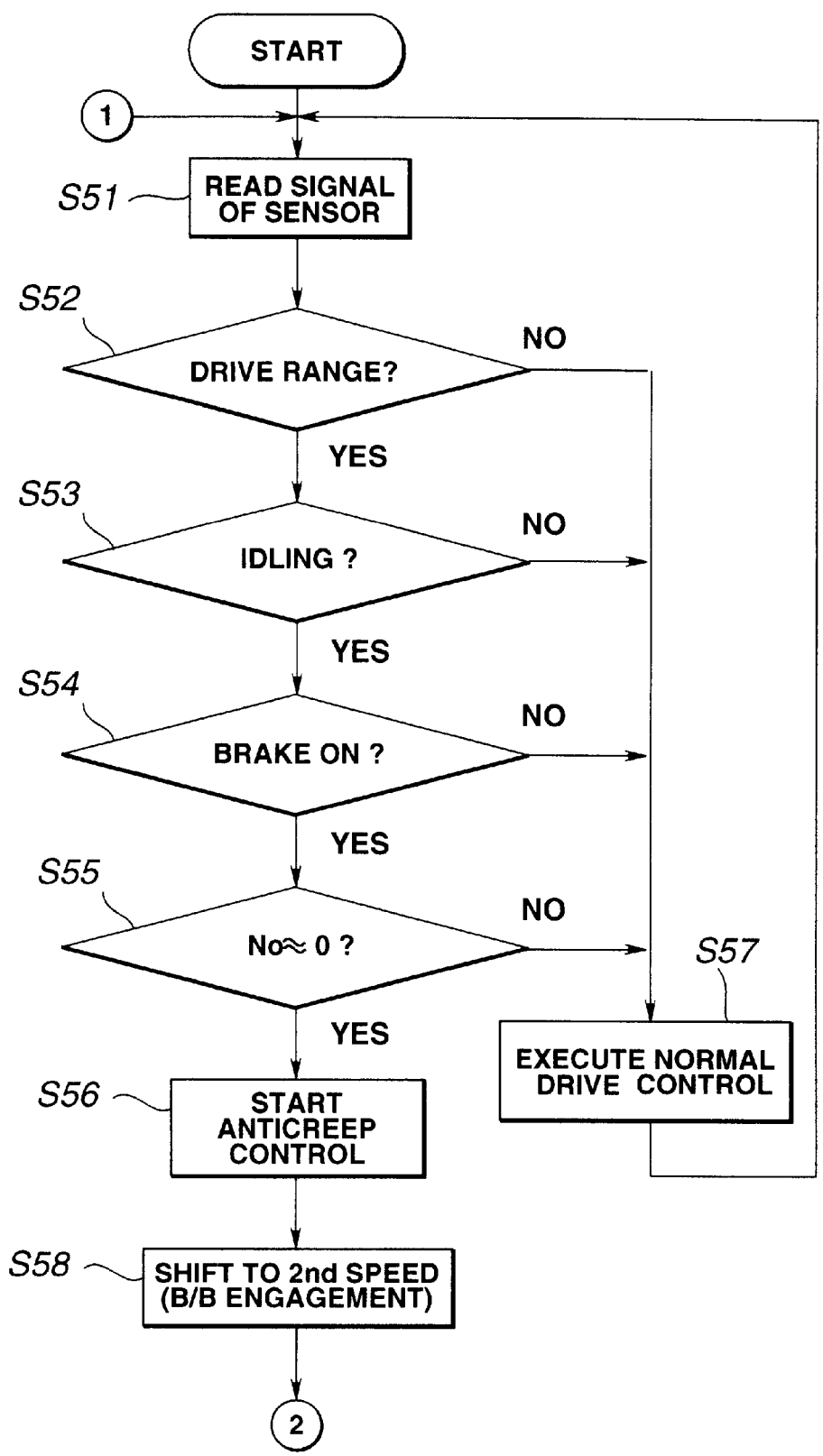
FIG. 3 is a part of a flowchart showing a control program of an anti-creep control executed by the anti-creep control apparatus of FIG. 1.
Figure 4:
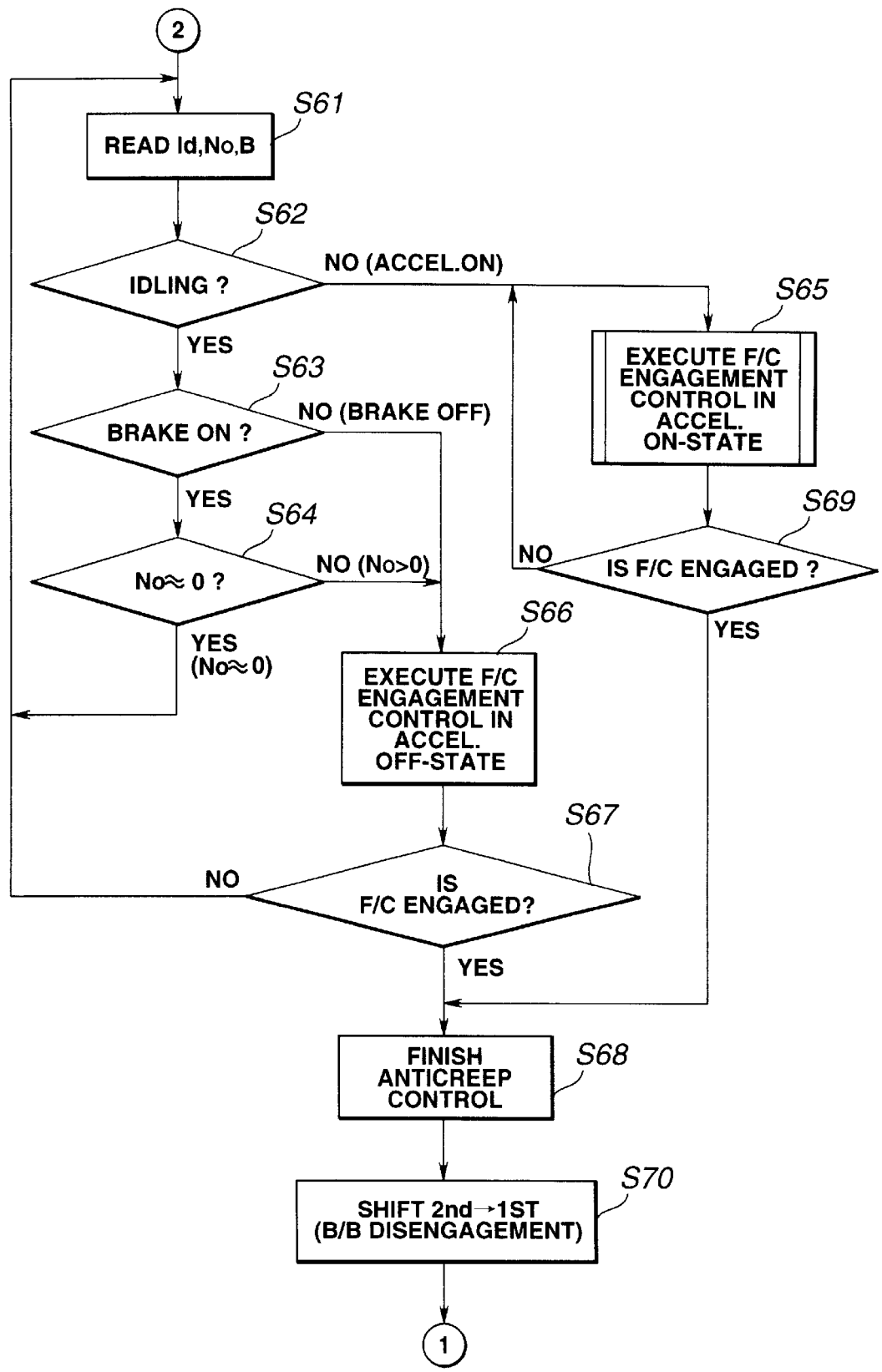
FIG. 4 is the other part of the flowchart showing a control program of an anti-creep control executed by the anti-creep control apparatus of FIG. 1.
Figure 5:
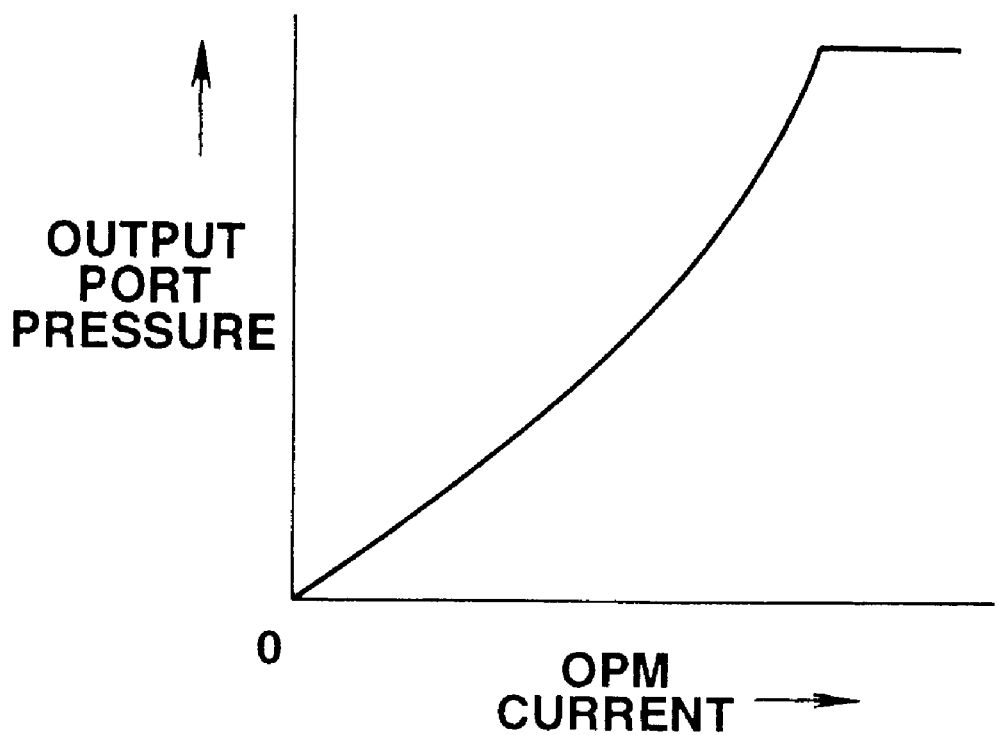
FIG. 5 is a graph showing a relationship between an electric current and an output port pressure of an oil pressure modulator (OPM) in the embodiment.
Figure 6A:
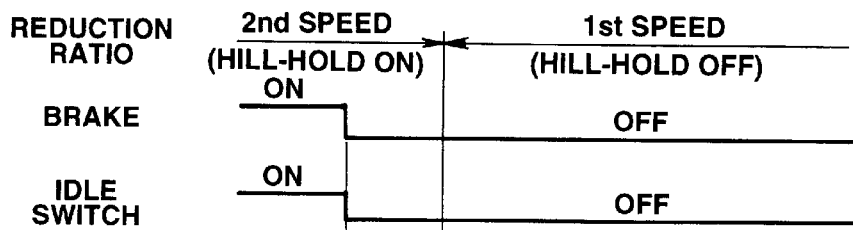
FIGS. 6A to 6D are time charts for explaining the manner of operation of the forward clutch engagement control in an acceleration ON state.
Figure 6B:
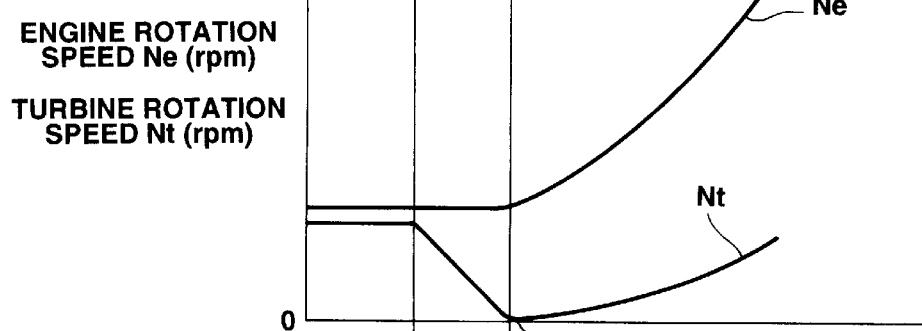
Figure 6C:
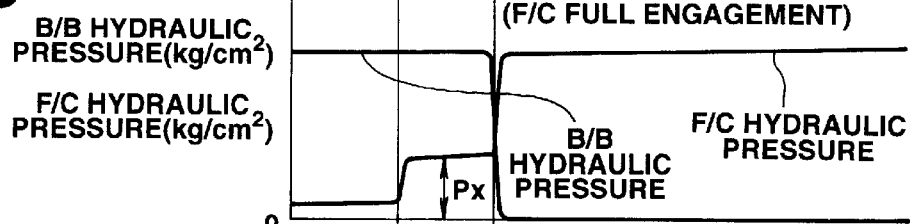
Figure 6D:
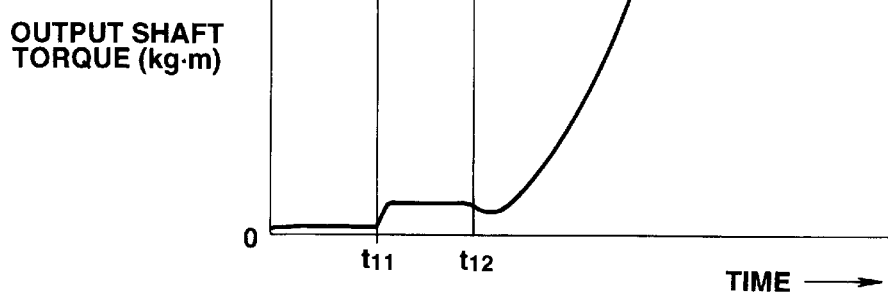
Figure 8A:
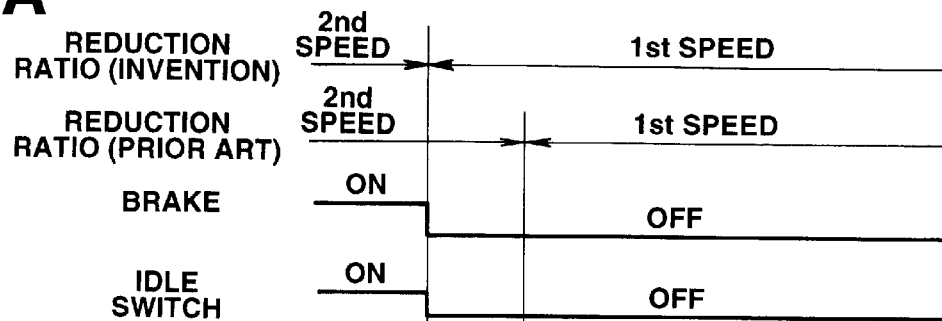
FIGS. 8A to 8D are time charts for explaining the manner of operation of the embodiment through the comparison with a conventional art.
Figure 8B:
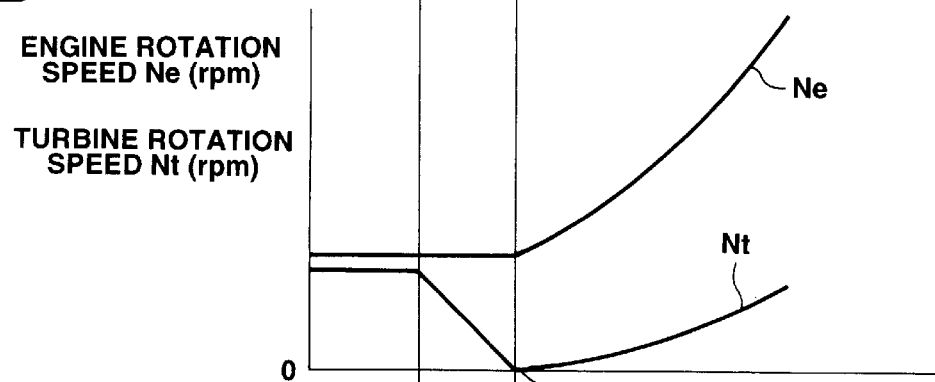
Figure 8C:
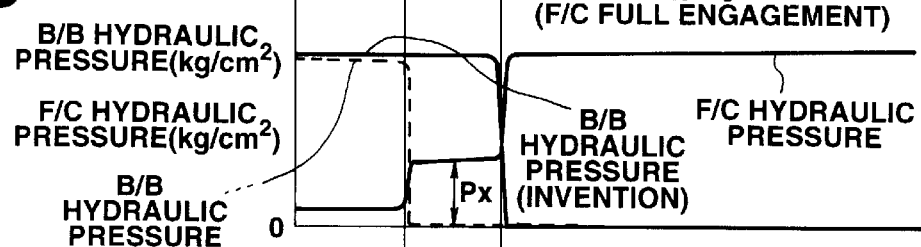
Figure 8D:
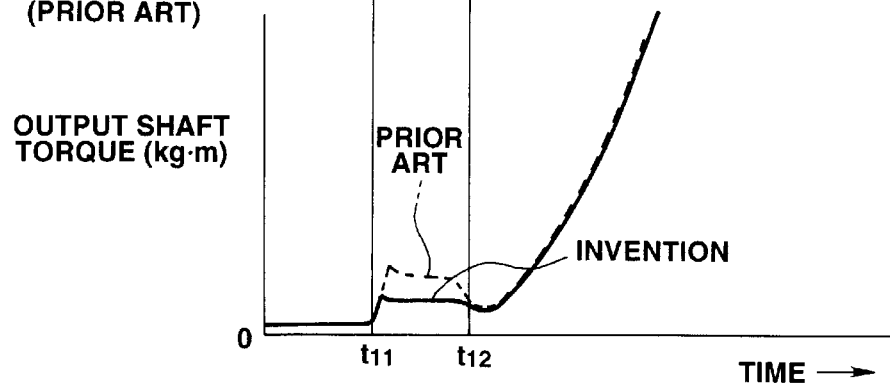

FIGS. 3 and 4 show a series of a flowchart indicative of a control program of a main routine of the anti-creep control.

At a step S51, the control unit 15 receives the signals PSW Id, No, and B from the corresponding sensors 161, 162, 164, and 167.

At a step S52, the control unit 15 decides as to whether the select range of the automatic transmission is a drive range (D-range) or not according to the signal PSW. When the select range is D-range, the routine proceeds to a step S53. When it is not D-range, the routine proceeds to a step S57 wherein a normal drive control is executed.

At the step S53, the control unit 15 decides as to whether the engine is put in the idle condition or not, on the basis of the signal Id. When the decision at the step S53 is YES, the routine proceeds to a step S54. When the decision at the step S53 is NO, the routine proceeds to the step S57, where the normal drive control is executed.

At the step S54 the control unit 15 decides according to the signal B as to whether the brake is operated or not, that is, as to whether the brake switch is turned ON or not. When the decision at the step S54 is YES, the routine proceeds to a step S55. When the decision at the step S54 is NO, the routine proceeds to the step S57.

At the step S55 the control unit 15 decides as to whether the vehicle speed No is generally zero or not, on the basis of the output shaft rotation-speed signal No. When the decision at the step S55 is YES, the routine proceeds to a step S56, where the anti-creep control is executed. When the decision at the step S55 is NO, the routine proceeds to the step S57.

Following to the execution of the step S56, the routine proceeds to a step S58, where the control unit 15 executes a hill-hold by shifting to the second speed by the engagement of the band brake (B/B) 71. That is, the anti-creep control is executed only when the vehicle situation satisfies all of four conditions where the automatic transmission is put in the drive range, the engine is put in the idle condition, the brake is operated, and the vehicle speed is generally zero. In other situations, the normal drive control is executed. During the execution of the step S56, the control unit 15 functions as an anti-creep control means.

After the execution of the step S58, the routine proceeds to a step S61 in the flowchart of FIG. 4.

At the step S61, the control unit 15 reads the signals Id, No, and B from the idle switch 162, the output shaft rotation-speed sensor 164, and the brake switch 167, respectively.

At the step S62, the control unit 15 decides on the basis of the signal Id as to whether the engine is put in the idle condition or not. When the decision at the step S62 is YES, the routine proceeds to a step S63. When the decision at the step S62 is NO, the routine proceeds to a step S65 where a forward-clutch engagement control in an acceleration-pedal ON-sate is executed in a manner to once raise the forward clutch hydraulic pressure to the shelf pressure Px after the acceleration pedal is depressed and to hold the shelf pressure Px by setting the forward clutch hydraulic pressure to the shelf pressure Px. After the execution of the step S65, the routine proceeds to a step S69, where the control unit 15 decides as to whether the engagement of the forward clutch 12 is achieved or not. The forward clutch engagement control in the acceleration pedal ON state is repeated until the control unit 15 decides at a step S69 that the engagement of the forward clutch 12 is achieved. The control unit 15 decides that the engagement of the forward clutch 12 is accomplished, for example, when the turbine rotation speed Nt becomes nearly zero. The above-mentioned control for holding the shelf pressure at Px is executed, for example, by setting the OPM electric current ix of the first OPM 13A at a value corresponding to the shelf pressure Px.

At the step S63, the control unit 15 decides on the basis of the signal B as to whether the brake is operated (turned ON) or not. When the decision at the step S63 is YES, that is, when the brake is operated, the routine proceeds to a step S64. When the decision at the step S63 is NO, the routine proceeds to a step S66, where a forward-clutch engagement control in an acceleration-pedal OFF-state is executed.

At the step S64, the control unit 15 decides on the basis of the vehicle speed signal No as to whether the vehicle speed is nearly zero or not. When the decision at the step S64 is YES, the routine returns to the step S61. When the decision at the step S64 is NO, the routine proceeds to the step S66.

That is, in a condition that the anti-creep control is now being executed and the engine is put in the idle condition, when the brake is not operated and when the vehicle speed No is greater than 0 (No>0), the forward clutch engagement control in acceleration-pedal OFF state is executed to slowly engage the forward clutch 12 by slopingly increasing the forward clutch pressure. The forward clutch engagement control is repeated until the control unit 15 decides at a step S67 that the engagement of the forward clutch 12 is achieved. The control unit 15 decides that the engagement of the forward clutch 12 is accomplished, for example, when the turbine rotation speed Nt becomes nearly zero.

When the decision at the step S67 or step S69 is YES, that is, when it is decided that the engagement of the forward clutch 12 is accomplished, the routine proceeds to a step S68, where the anti-creep control is finished and the forward clutch hydraulic pressure is set maximum. Following to the execution of the step S68, the routine proceeds to a step S70, where the control unit 15 cancels the hill-hold control in a manner that the shift position of the automatic transmission is changed from the second speed to the first speed through releasing the band brake B/B.

Next, the manner of operation of the embodiment according to the present invention will be discussed with reference to FIGS. 6A to 8D.

As shown in FIGS. 6A to 6D, in case of the forward clutch engagement control in the acceleration-pedal ON state, at the time period before the starting operation (before the moment t11), the brake is depressed (the brake switch 167 is turned ON), and the acceleration pedal is not depressed (the idle switch 162 is turned ON). During this time period, the engine rotation speed Ne is nearly the idle rotation speed, the turbine rotation speed Nt is slightly smaller than the engine rotation speed Ne, the forward clutch hydraulic pressure and the output shaft torque are nearly zero, the band brake hydraulic pressure becomes maximum, and the reduction speed ratio of the automatic transmission is in the second speed whose reduction speed ratio is smaller than the maximum reduction speed ratio. During this time period before the starting operation, the anti-creep control and the hill-hold control are executed.

The step S65 of FIG. 4 is executed at the moment t11 when the starting operation is executed by turning OFF the idle switch 162 and the brake switch 167 and the control unit 15 decides that the anti-creep control is cancelled. By this execution of the step S65, the forward clutch hydraulic pressure is increased to the shelf pressure Px and is held at the pressure Px by supplying the OPM electric current ix to the first oil pressure modulator 13A. Therefore, the forward clutch 12 is fully engaged at the moment t12 of FIGS. 6A to 6D. During a time period from the moment t11 to the moment t12, the band brake hydraulic pressure is held maximum, the reduction speed ratio of the automatic transmission is held at the second speed, and the hill-hold control is maintained. At the moment t12 when the engagement of the forward clutch 12 is accomplished, the step S70 shown in FIG. 4 is executed. By the execution of the step S70, the band brake B/B is disengaged since the band brake hydraulic pressure becomes zero, and the reduction speed ratio of the automatic transmission is changed from the second speed to the first speed (the maximum reduction speed ratio). Therefore, the hill-hold control is cancelled, and the forward clutch hydraulic pressure is set maximum.

Figure 9:
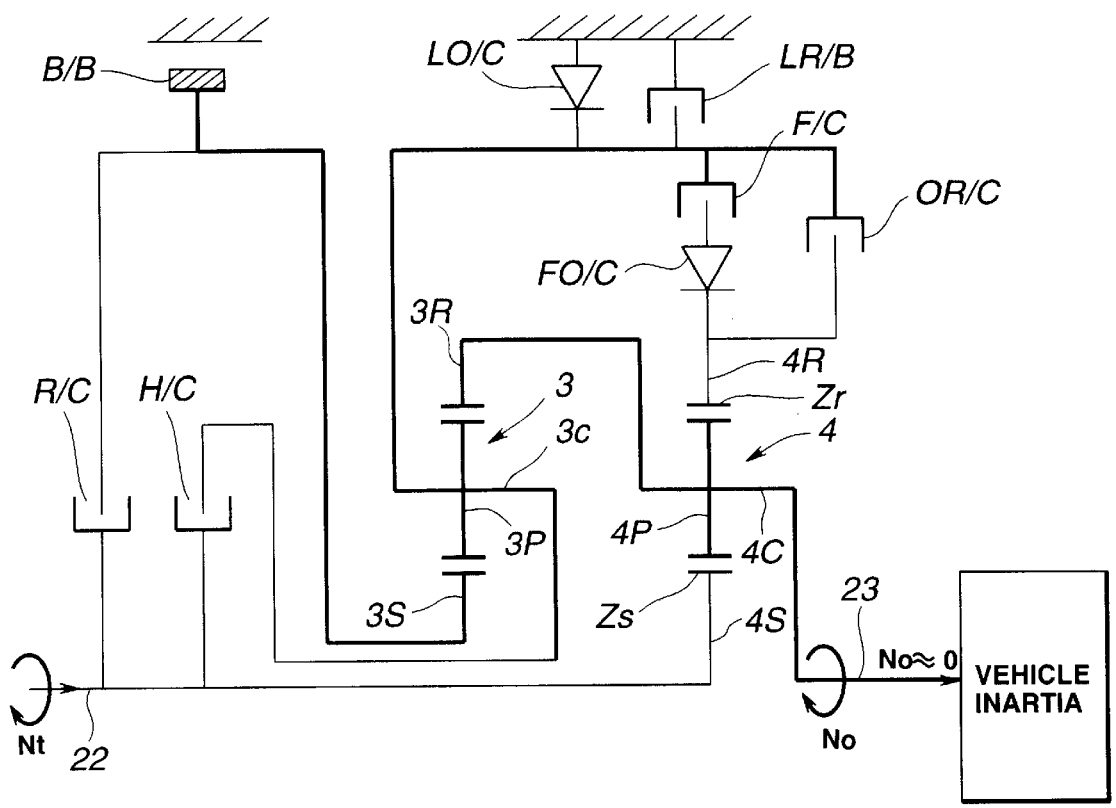
FIG. 9 is a schematic view for explaining a principle of the decision of the forward clutch engagement.

During the above-mentioned control, the control unit 15 decides the accomplishment of the engagement of the forward clutch 12 by detecting as to whether the turbine rotation speed Nt is nearly zero. The reason why the control unit 15 decides on the basis of Nt=0 is as follows. During the execution of the anti-creep control and the hill-hold control, the band brake B/B is operated (engaged) and the vehicle speed (or the output shaft rotation speed) becomes nearly zero, and the rotation elements, which are described by the wide continuous line in FIG. 9, are put in the inoperative condition. For a time period from the start time of the starting operation to the time when the forward clutch 12 is engaged, the rotation elements are still put in the inoperative condition since the band brake B/B is operated and the inertia of the output shaft system is large.

Accordingly, the slip amount $\Delta N$ of the forward clutch 12 is expressed by the following equation.

$$\Delta N = \text{(rotation speed of carrier } 4R) = -(Zs/Zr) \times Nt = -\alpha \times Nt$$

wherein Zs is the number of teeth of the carrier 4S, and Zr is the number of teeth of the internal gear 4R.

Therefore, a relation ΔN Nt is established, and it is concluded that the forward clutch 12 was fully engaged at the moment t12 when the turbine rotation speed Nt becomes nearly zero (Nt=0).

Figure 10:
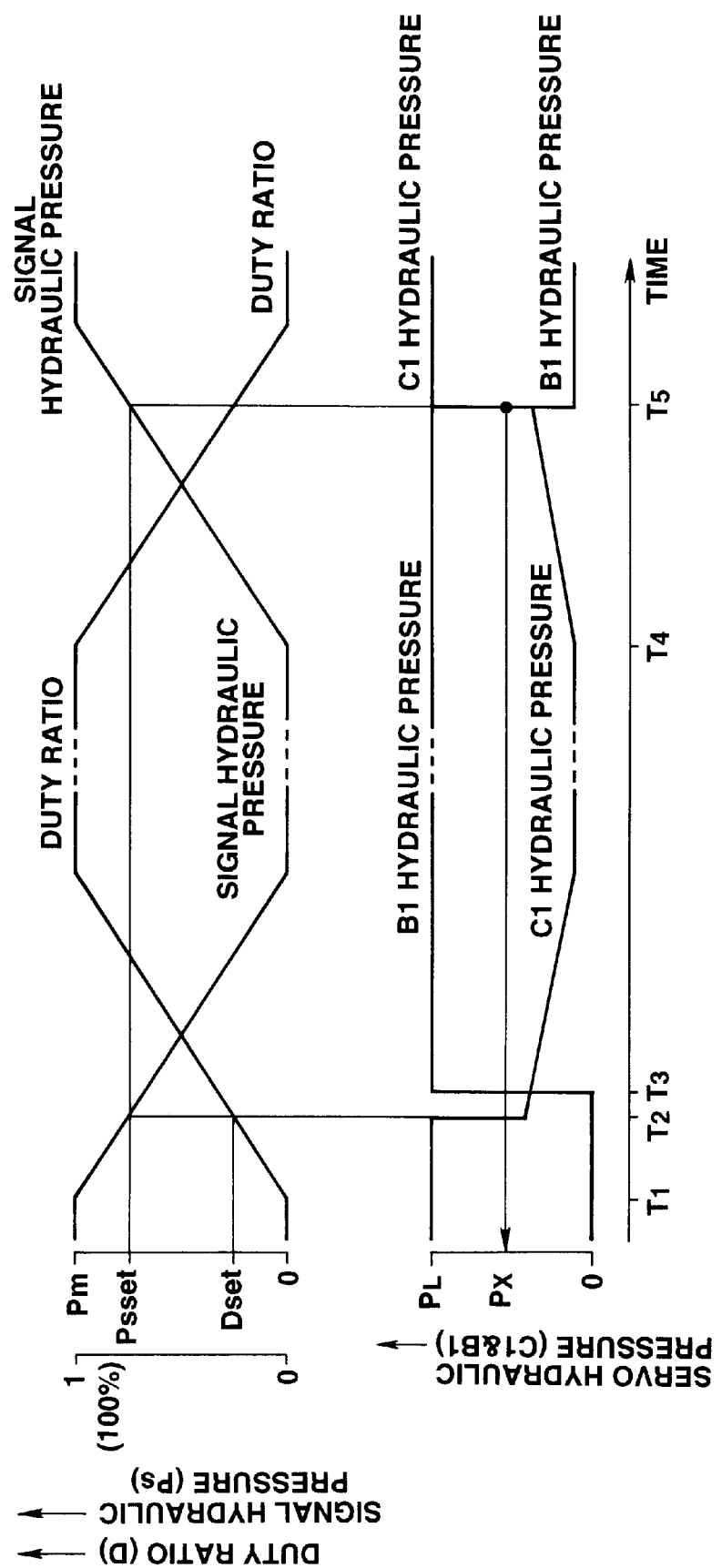
FIG. 10 is a time chart for explaining an prior art.

On the other hand, the conventional anti-creep control apparatus shown in FIG. 10 is arranged such that at the moment t11 the band brake is promptly released, the reduction speed ratio of the automatic transmission is changed to the first speed, and the engagement of the forward clutch is started, as shown in FIGS. 8A to 8D. Therefore, the shock due to the engagement of the forward clutch is amplified by the gear ratio of the first speed and is outputted as the output shaft torque. This impresses a large engagement shock to a driver, as shown by a dotted line in FIG. 8D.

In contrast, with the embodiment of the anti-creep control apparatus according to the present invention, even if the engagement of the forward clutch 12 is started from the moment t11, the band brake B/B is not promptly engaged and the reduction speed ratio of the automatic transmission is held at the second speed. Therefore, the shock due to the engagement of the forward clutch 12 is suppressed by the ratio between the reduction speed ratio of the second speed and that of the first speed (second speed/first speed). The output shaft torque is changed to form a smooth wave form during the time period from the moment t11 to the moment t12 and performs a raising characteristic without time lag after the moment t12. Further, this apparatus according to the present invention firmly prevents the vehicle back-move phenomenon that a vehicle is moved backward on the uphill road, where the forward clutch is degraded by entrained air to the hydraulic passage of the clutch control hydraulic system.

On the other hand, in case of the forward clutch engagement control in the acceleration OFF state, during a time period before the moment t11, the reduction speed ratio of the automatic transmission is set at the second speed by the engagement of the band brake, and the anti-creep control and the hill-hold control are executed as shown by the time charts of FIGS. 7A to 7D. When the brake pedal is released and the control unit 15 decides that the anti-creep control is cancelled at the moment t11, the forward clutch hydraulic pressure is slopingly slowly increased to smoothly engage the forward clutch 12 by the execution of the step S66 of FIG. 4. Therefore, the output shaft torque is slowly increased, and the turbine rotation speed Nt is slowly decreased. During this time period, the band brake B/B is engaged since the band brake hydraulic pressure is held maximum. At the moment t13 when the control unit 15 decides that the forward clutch 12 is fully engaged from Nt=0, the band brake hydraulic pressure becomes nearly zero and the band brake B/B is disengaged (released). Therefore, the hill-hold control is cancelled and the forward clutch hydraulic pressure becomes maximum.

When the forward clutch engagement control is in the acceleration OFF state, the hill-hold control is also executed since the band brake B/B is engaged and the reduction speed ratio of the automatic transmission is set at the second speed until the engagement of the forward clutch is accomplished. Therefore, the vehicle back-move phenomenon on a uphill road is firmly prevented.

The entire disclosure of Japanese Patent Application No. 8-173446 filed on Jul. 3, 1996 including specification, claims, drawings and summary are incorporated herein by reference in its entirety.

What is claimed is:

1. An automatic transmission for receiving power from an engine of a vehicle and outputting power through an output shaft, said automatic transmission comprising:

a torque converter for receiving power output from the engine;

a first friction element operable during a drive range of the automatic transmission;

an anti-creep control apparatus for controlling slippage of said first friction element during the drive range of the automatic transmission and when the vehicle is stopping, said anti-creep control apparatus including means for determining whether said first friction element is fully engaged;

a second friction element for preventing the output shaft of the automatic transmission from reversely rotating when said anti-creep control apparatus is controlling slippage of said first friction element;

an engine output detecting means for detecting an output of the engine;

a brake detecting means for detecting whether a brake of the vehicle is applied;

an output shaft rotation speed detecting means for detecting a rotation speed of the output shaft of the automatic transmission;

an engagement holding means for holding said second friction element engaged to prevent the transmission output shaft from rotating reversely until said anti-creep control apparatus determines that said first friction element is fully engaged; and a disengaging means for disengaging said second friction element after said first friction element is fully engaged.

2. An automatic-transmission as claimed in claim 1, wherein said anti-creep control apparatus includes means for selecting a speed ratio of the automatic transmission to a ratio that is smaller than a maximum reduction speed ratio when said first and second friction elements are both engaged and to the maximum reduction speed ratio when said first friction element is fully engaged and said second friction element is disengaged.

3. An automatic-transmission as claimed in claim 1, wherein said engine output detecting means includes one of an idle switch and an engine throttle sensor.

4. An automatic-transmission as claimed in claim 1, wherein said anti-creep control apparatus cancels the slippage control of the first friction element when either the engine output detected by said engine output detecting means is greater than a predetermined value or said brake detecting means detects that the vehicle brake is being applied.

5. An automatic transmission as claimed in claim 1, wherein said second friction element prevents the reverse rotation of the output shaft of the automatic transmission through a one-way clutch.

6. An automatic transmission for receiving power from an engine of a vehicle and outputting power through an output shaft, said automatic transmission comprising:

a torque converter for receiving power output from the engine;

a first friction element operable during a drive range of the automatic transmission;

a second friction element for preventing the output shaft of the automatic transmission from reversely rotating;

an idle switch for detecting whether a rotation speed of the engine is greater than a predetermined value;

a brake switch for detecting whether a brake of the vehicle is applied;

an output shaft rotation speed sensor for detecting a rotation speed of the output shaft of the automatic transmission; and an anti-creep control unit comprising:
- means for controlling slippage of said first friction element during a drive range of the transmission and when the vehicle is stopping,
- means for determining whether the first friction element is fully engaged,
- means for controlling said second friction element to prevent the output shaft of the automatic transmission from reversely rotating while controlling slippage of said first friction element,
- wherein said anti-creep control unit engages said second friction element until said anti-creep control unit determines that said first friction element is fully engaged, and disengages said second friction element after said first friction element is fully engaged.

7. An automatic transmission as claimed in claim 6, wherein said anti-creep control unit includes a microcomputer and first and second oil pressure modulators hydraulically connected to said first and second friction elements, respectively, said anti-creep control unit controlling engagement and disengagement of said first and second friction elements by controlling said first and second oil pressure modulators.

8. An automatic transmission as claimed in claim 7, wherein said first and second oil pressure modulators each include an electric solenoid, said anti-creep control unit controlling each of said first and second oil pressure modulators by controlling electric current supplied to the respective solenoid of said first and second oil pressure modulators to control hydraulic pressure supplied to each of said first and second friction elements.

9. An automatic transmission for receiving power from an engine of a vehicle and outputting power through an output shaft, said automatic transmission comprising:

a torque converter for receiving power output from the engine;

a first friction element operable during a drive range of the automatic transmission;

a second friction element for preventing the output shaft of the automatic transmission from reversely rotating;

a sensor unit for detecting an engine output, an engine rotation speed, and an output shaft rotation speed of the automatic transmission; and an anti-creep control unit for starting and stopping an anti-creep control on the basis of signals from said sensor unit, said anti-creep control unit comprising:
- means for controlling slippage of said first friction element during a drive range of the automatic transmission,
- means for controlling said second friction element so as to prevent a reverse rotation of an output shaft of the automatic transmission during the anti-creep control;
- means for controlling said second friction element to prevent the output shaft of the automatic transmission from reversely rotating while controlling slippage of said first friction element,
- means for determining whether said first friction element is fully engaged,
- wherein said anti-creep control unit engages said second friction element until said anti-creep control unit determines that said first friction element is fully engaged, and disengages said second friction element after said first friction element is fully engaged.

* * * * *